INVENTOR
JOHANNES KAASHOEK
TEUNIS POORTER
JOSUE JEAN PHILIPPE VALETON
BY
AGENT

Oct. 11, 1960  J. KAASHOEK ET AL  2,956,113

CIRCUIT ARRANGEMENT FOR MULTIPLYING FUNCTIONS IN THE FORM OF ELECTRICAL SIGNALS

Filed Aug. 15, 1958  3 Sheets-Sheet 2

INVENTOR
JOHANNES KAASHOEK
TEUNIS POORTER
JOSUE JEAN PHILIPPE VALETON
BY
Frank R. Jifani
AGENT INVENTOR
JOHANNES KAASHOEK
TEUNIS POORTER
JOSUE JEAN PHILIPPE VALETON
BY
Frank R. Jeffers
AGENT United States Patent Office 2,956,113

Patented Oct. 11, 1960

2,956,113

CIRCUIT ARRANGEMENT FOR MULTIPLYING FUNCTIONS IN THE FORM OF ELECTRICAL SIGNALS

Johannes Kaashoek, Teunis Poorter, and Josue Jean Philippe Valeton, all of Eindhoven, Netherlands, assignors to North American Philips Company, Inc., New York, N.Y., a corporation of Delaware Filed Aug. 15, 1958, Ser. No. 755,326

Claims priority, application Netherlands Aug. 21, 1957

9 Claims. (Cl. 178—5.4)

The invention relates to a circuit arrangement for multiplying functions in the form of electrical signals, in which at least two functions are multiplied one by the other, each of these functions varying with at least one independent variable, which also has the form of an electrical signal.

Such arrangements are used, inter alia in studio apparatus for colour television, in which the contrast range of the recorded scenery, either of a reproduced film or of a direct exposure is larger or smaller than the contrast range of the apparatus, which is intended to reproduce the recorded scenery. These arrangements may also be used to correct the so-called gamma of the film and the gradation of the reproduced image.

In order to match the two contrast ranges with each other and with a film gamma, which may be different, it has been suggested to apply, apart from the conventional gamma correction, an additional correction, so that the said matching can be achieved and, moreover, the dark image parts can be additionally touched up. See for example the article of Brewer, W. L., Ladd, J. H., and Penney, J. E.: "Brightness Modification Proposals for Television Colour Film" in P. I. R. E., vol. 42, January 1954.

In principle, this additional correction consists in that each of the colours of the colour television signal is multiplied by a function which depends, in itself, upon the brightness signal. The separate formation of this function and the subsequently required multiplication process give rise to complicated, unreliable arrangements.

These problems apply not only to colour television, but to all cases, in which such multiplications are to be carried out and in which it is useful to have simple, reliable arrangements available. The arrangement according to the invention provides a solution for these problems and is characterized in that it comprises at least one series combination of two substantially identical amplifying elements, at least one independent variable of one of the functions being supplied to a control-electrode of each of the two amplifying elements and in parallel with one of the said amplifying elements at least one further amplifying element is connected, to the control-electrode of which is supplied at least one independent variable of the other function, whilst the output signal is obtained from the junction point of the series combination, where the first amplifying element is connected to the second, and the independent variables may be wholly or partly independent of each other.

A few potential embodiments of the circuit arrangement according to the invention will be described with reference to the figures.

Fig. 1 shows diagrammatically a multiplying arrangement according to the invention.

Figs. 2 and 3 serve for explanation.

Fig. 4 shows an arrangement employed in conjunction with the arrangement shown in Fig. 1.

Fig. 5 serves for explanation.

Figure 1:
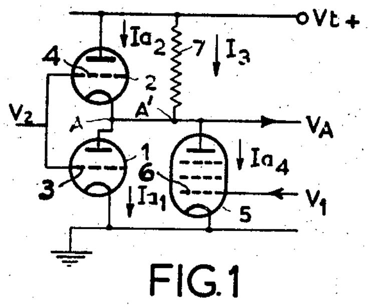

Referring to Fig. 1, the control-grids 3 and 4 of the triode tubes 1 and 2, connected in series to a direct-voltage source (not shown) have supplied to them the signal $V_2$. To the control-grid 6 of the discharge tube 5 is supplied the signal $V_1$ and the latter tube is connected via a resistor 7 to the positive terminal of the direct-voltage source, whilst the junction point A of the triode tubes is connected to the junction A′ of the tube 5 and the resistor 7.

For a good understanding of the operation of the circuit arrangement, first the series combination of the two triode tubes will be considered, it being assumed that the connection A—A′ is interrupted. If substantially identical tubes are employed and if the output voltage at point A is designated $V_A$, it must apply to the anode currents in accordance with the known equation that:

$$I_{a1}=SV_{g1}+\frac{V_A}{R_i}=SV_2+\frac{V_A}{R_i} \text{ for tube 1} \quad (1)$$

and $$I_{a2}=SV_{g1}+\frac{V_A}{R_i}=S(V_2-V_A)-\frac{V_A}{R_i} \text{ for tube 2} \quad (2)$$

wherein $V_{g1}$ and $V_{g2}$ designate the control-grid voltages, S the steepness and $R_i$ the internal resistance of the tubes 1 and 2.

The two tubes are adjusted in a manner such that they convey continuously the same current, i.e. $I_{a1}=I_{a2}$ and by means of the above equation it follows therefrom that this is only true, if $V_A=0$.

If the resistor 7 is chosen to be such and if the tube 5 is adjusted in a manner such that the direct voltage at point A′ is equal to that at point A, it will further be true, even when the points A and A′ are connected to each other, that $$V_A=0 \text{ for } V_2\neq 0 \text{ and } V_1=0$$

If $V_1\neq 0$, the current of the pentode tube, which may be considered as a source of current owing to its high internal resistance, will divide itself across the resistor 7 and the triode tube 2. To the junction point A—A′ must then apply:

$$I_{a2}+I_3=I_{a4}+I_{a1} \quad (3)$$

wherein $I_3$ designates the current through the resistor 7 and $I_{a4}$ the anode current of tube 5. For the latter we may write with a certain approximation:

$$I_{a4}=S_pV_1 \quad (4)$$

wherein $S_p$ designates the steepness of tube 5.

If $R_7$ is chosen to be high with respect to the maximum internal resistance of tube 2, $I_3$ is negligible with respect to $I_{a2}$. With this approximation and by means of the Formulae 1, 2 and 4, it follows from 3:

$$V_A=\frac{-S_pV_1}{S+\frac{2}{R_i}}=-S_pV_1\frac{R_i}{SR_i+2} \quad (5)$$

If the anode impedance of tube 5 is designated by $R_a$, it can be written for the output voltage of tube 5 that:

$$V_A=-S_pV_1R_a$$

(6*a*). From (5) and (6*a*) it follows that owing to the combination of the series connection of the tubes 1 and 2 and of the tube 5, the latter has an anode impedance $$R_a=\frac{R_i}{SR_i+2}$$

wherein $R_a$ is a function of $V_2$, but that the output voltage $V_A$, owing to the aforesaid adjustment of the substantially identical tubes 1 and 2, is not further dependent upon the control-voltage $V_2$.

For $R_a$ one may write, with a certain approximation:

$$R_a=\frac{1}{S+2/R_i}\approx 1/S$$

since, in most cases, $S\gg 2/R_i$.

Since, as stated above, and as will be explained more fully hereinafter, $R_a=f(V_2)$ and since $S_p$ is a tube constant, for (6*a*) one may write:

$$V_A=-S_pR_aV_1=-\text{conustant } f(V_2)V_1 \qquad (6)$$

In practice it is not possible to find two completely identical triode tubes, so that apart of the desired signal an interference signal occurs. By choosing suitable tubes and by a correct adjustment, this interference signal may be reduced to a satisfactory extent.

With colour television $V_2$ designates the brightness signal $V_y$, which is composed of the three colour signals $V_R$, $V_G$ and $V_B$, in accordance with:

$$V_y=\alpha V_R+\beta V_G+\delta V_B \qquad (7)$$

wherein $V_R$ designates the red signal, $V_G$ the green signal and $V_B$ the blue signal and wherein $\alpha$, *b* and $\delta$ designate the proportionality constants associated with the system.

The signal $V_1$, which is applied to the control-grid 6 of the discharge tube 5, is the colour signal to be corrected, for example the signal $V_R$. From point A' can be obtained the corrected signal $V'_R$.

It is known that it is required for a satisfactory transmission of a colour television image that the transmission characteristic curve for each colour should be substantially linear.

Non-linearities in pick-up and reproducing tubes are compensated with the aid of known $\gamma$-correction circuits in the individual colour channels, so that the $\gamma$ of each channel is rendered equal to 1 over the largest possible portion of the characteristic curve. The maximum and minimum brightness of the reproduced image are subjected to physical limits, so that the contrast region is limited and a $\gamma=1$ is attained only for part of the characteristic.

A a rule, the contrast region of the reproduced scenery differs from the aforesaid value. If the scenery has a larger contrast region, part of the information in the dark parts gets lost.

Figure 2:
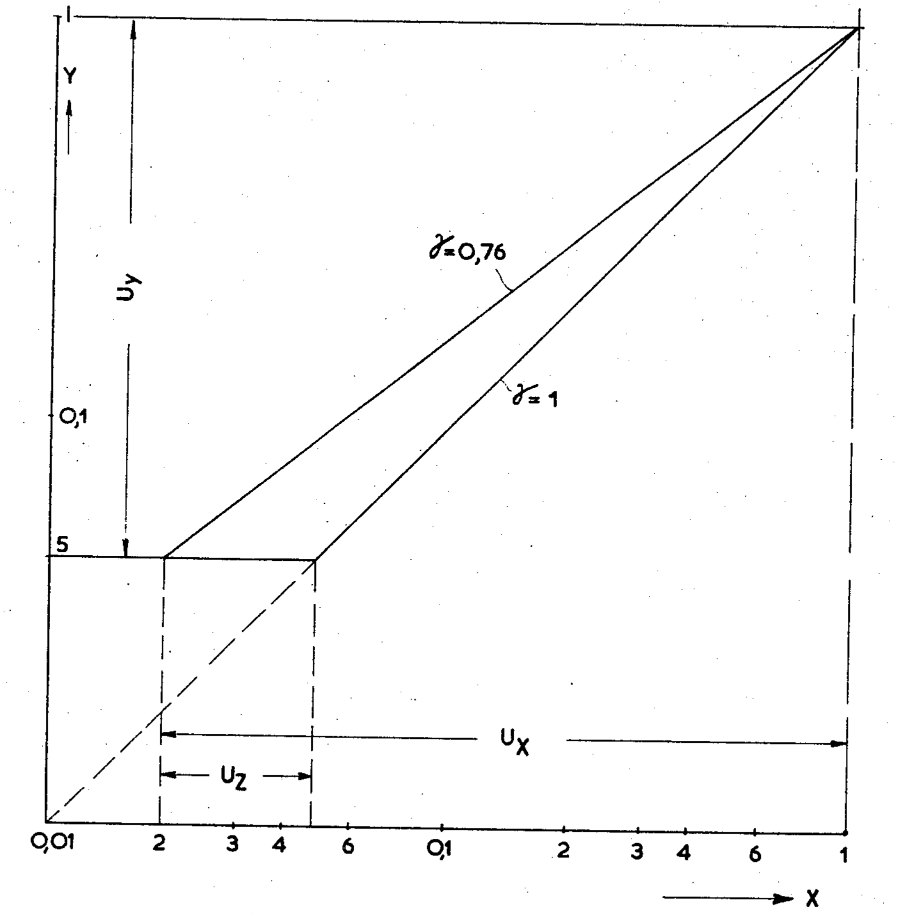

This is illustrated in Fig. 2, in which the relative brightness *x* of the recorded scenery is plotted on the abscissa and the relative brightness *y* of the reproduced image on the ordinate on a logarithmical scale. It will be assumed that the records scenery has a contrast region $U_x$ of 1:50 and that the reproducing apparatus is capable of reproducing only a contrast region $U_y$ of 1:20, a part $U_z$ of the information of the record scenery will get lost, when $\gamma=1$.

The total information can be reproduced, if the $\gamma$ of the transmission channel has a value lower than 1. In the example shown in Fig. 2, $\gamma$ is chosen to be 0.76.

If the contrast region of the scenery is smaller than the available contrast region of the reproducing apparatus, matching may, if desired, be obtained with a $\gamma$ exceeding 1.

When reproducing films or slides, there may be other reasons, for example a film gamma exceeding 1, for a varied reproduction of the gradation by providing intentionally a $\gamma$ unequal to 1 for the characteristic of the system. If, to this end the $\gamma$ of the separate channels is varied, colour errors occur. The desired gradation variation may, however, be obtained without the occurrence of colour errors, b multiplying each colour signal by a factor *k* ($V_y$), which is a given function of the brightness signal. It follows therefrom that the corrected signals assume the forms:

$$V'_R=k(V_y)V_R$$
$$V'_G=k(V_y)V_G \text{ and}$$
$$V'_B=k(V_y)V_B$$

The brightness signal becomes:

$$V'_y=\alpha V'_R+\beta V'_G+\delta V'_B=k(V_y)\{\alpha V_R+\beta V_G+\delta V_B\}=k(V_y).V_y$$

This result must correspond as far as possible with:

$$V'_y=V_y\gamma$$

Consequently, the multiplication factor is:

$$k(V_y)=\frac{1}{V_y(1-\gamma)}=V_y^{(\gamma-1)}$$

By using the arrangement shown in Fig. 1 three times and by applying to the control-grids 6 the signals $V_R$, $V_G$ and $V_B$, in accordance with Formula 6*a*, we obtain the output signals:

$$V'_R=-S_{p1}R_aV_R=-S_pR_aV_R \qquad (8)$$
$$V'_G=-S_{p2}R_aV_G=-S_pR_aV_G \qquad (9)$$
$$V'_B=-S_{p3}R_aV_B=-S_pR_aV_B \qquad (10)$$

since, for three identical tubes, we may write with a certain approximation:

$$S_{p1}\approx S_{p2}\approx S_{p3}\approx S_p$$

With the aid of Formula 7 and the Formulae 8, 9 and 10, we find:

$$V'_y=\alpha V'_R+\beta V'_G+\delta V'_B=-S_pR_a.V_y=-k(V_y)\cdot V_y$$

Figures 3, 4, 5:
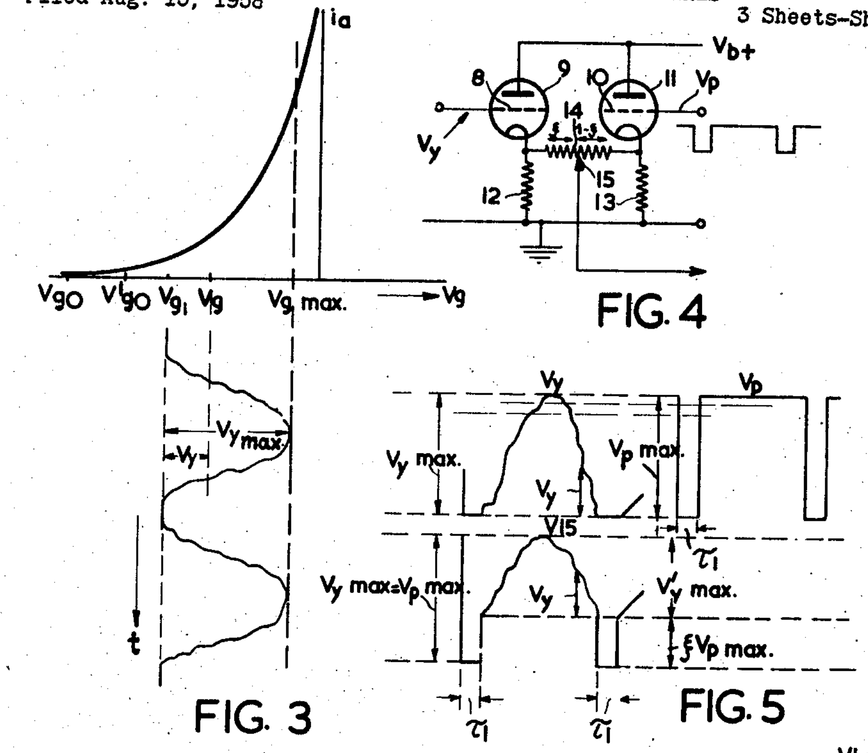

On the basis of Fig. 3, $R_a$ as a function of $V_y$ can be calculated. To this end it is assumed that the anode-current-grid-voltage characteristic curve of tube 2 and hence approximately also that of tube 1, illustrated in Fig. 3, can be represented with a certain approximation by the formula:

$$i_a=C_1(V_g-V_{g0})^n \qquad (11)$$

wherein: $V_{g0}$ is the cutoff voltage of the tube at the desired adjustment, $C_1$ is a constant of such a dimension that the dimensions of the right-hand and left-hand terms of the Equation 11 are equal to each other, $V_g$ is the instantaneous grid voltage, $i_a$ the instantaneous value of the anode current and *n* an exponent exceeding 1.

Referring to Fig. 3, $V_{g1}$ designates the voltage corresponding to the black level and $V_{g\,max}$ the voltage corresponding to the white level of the brightness signal $V_y$ illustrated in this figure.

Now is $$R_a\approx\frac{1}{S}=\frac{1}{\left(\frac{\delta i_a}{\delta V_g}\right)V_a}$$

from which follows with the aid of 11:

$$R_a=\frac{1}{C_1n}(V_g-V_{g0})^{1-n} \qquad (12)$$

If for $V_g$ is substituted the value $V_y+V_{g1}$, $$R_a=\frac{1}{C_1n}(V_y+V_{g1}-V_{g0})^{1-n}$$

If $V_{g1}$ coincides with $V_{g0}$, $$R_a=\frac{1}{C_1n}Vy^{(1-n)}$$

If $1-n$ is equal to $\gamma-1$, the desired correction is obtained, at which the value of $\gamma$ is determined by *n*. If $/V_{g1}/<V_{g0}/$, pure $\gamma$ curve is no longer obtained. It does, however, apply that for $V_y=0$, $R_a$ becomes maximum and for $V_y=V_{y\,max}$ $R_a$ becomes minimum, so that a gradation variation in the desired direction occurs. The characteristic curve obtained appears to be a reasonable approximation of a $\gamma$-curve, of which the $\gamma$ lies between $2-n$ and 1.

A control of the correction is possible by a control of $V_{g1}$, whilst $V_{g\,max}$ must be kept constant, since the value $R_a$ thus determined determines the gain of the maximum brightness. The latter must not vary during control of the gradation.

The maximum permissible value of $R_a$ is determined by the desired bandwidth and occurs at $V_g=V_{g1}$, so that $V_{g1}$ must not exceed a given value $V'_{g0}$.

The characteristic curve may be calculated as follows. From Fig. 3 it follows that:

$$V_g-V_{g1}=V_y$$

and $$V_{g\,max}-V_{g1}=V_{y\,max}$$

so that:

$$V_g-V_{g1}=\frac{V_y}{V_{y\,max}}(V_{g\,max}-V_{g1})$$

with $$V_g-V_{g0}=(V_g-V_{g1})+(V_{g1}-V'_{g0})+(V'_{g0}-V_{g0})$$

and assuming that $$\epsilon=\frac{V_{g1}-V'_{g0}}{V_{g\,max}-V'_{g0}}$$

and $$H=\frac{V'_{g0}-V_{g0}}{V_{g\,max}-V'_{g0}}$$

It is found after substitution that:

$$V_g-V_{g0}=\left\{\frac{V_y}{V_{y\,max}}\cdot(1-\epsilon)+(\epsilon+H)\right\}(V_{g\,max}-V'_{g0})$$

Substituting this in Equation 12, we obtain:

$$R_a=\frac{1}{C_1 n}(V_{g\,max}-V'_{g0})^{1-n}\cdot\left\{\frac{V_y}{V_{y\,max}}\cdot(1-\epsilon)+(\epsilon+H)\right\}^{1-n}$$

or:

$$R_a=K\left\{\frac{V_y}{V_{y\,max}}\cdot(1-\epsilon)+(\epsilon+H)\right\}^{1-n} \qquad (13)$$

with $$K=\frac{1}{C_1 n}(V_{g\,max}-V'_{g0})^{1-n}$$

With a constant $V_{g\,max}$ the parameter $\epsilon$ is determined by the adjustment of $V_{g1}$. The adjustment of $\epsilon$ is obtained by linear interpolation between the signals $V_y$ and $V_p$, wherein $V_p$ designates a pulsatory signal having an amplitude $V_{p\,max}$ which is equal to $V_{y\,max}$.

The pulse of the signal $V_p$ has a polarity opposite that of the brightness signal and occurs for a time which is equal to or shorter than the horizontal black-out time $\tau_1$ of the brightness signal.

This interpolation can be obtained within the desired limits with the aid of an arrangement, known per se and shown in Fig. 4. In this arrangement the resistor 14 must be high with respect to the total impedance of tube 9 and resistor 12 (tube 10 and resistor 13 respectively). In this case, it applies to the signal at the tapping 15 that:

$$V_{15}=\xi V_p+(1-\xi)\cdot V_y \qquad (14)$$

wherein, as is indicated in Fig. 4, is determined by the position of the tapping 15.

In Fig. 5, in which the signals $V_y$, $V_p$ and $V_{15}$ are illustrated, the combined signal $V_{15}$ has an indication of the black level determined by the value of $\xi$, since the signal $V_y$ can now vary only between the value $\xi\, V_{p\,max}$ and $V_{y\,max}$. If, subsequent to the supply to the grids 3 and 4 of the arrangement shown in Fig. 1, the lower side of the signal 15 applied to the level of $V'_{g0}$ (for example with the aid of biassed D.C. component restorers), $\xi\, V_{p\,max}$ will determine the value of $V_{g1}$ so that $\xi$ may be assumed to be equal to $\epsilon$, from which follows that, with the aid of the displaceable tapping 15, the region within which $R_a$ can vary in accordance with Formula 13 is adjusted.

It follows furthermore from Formula 14 that if $V_y\rightarrow V_{y\,max}=V_{p\,max}$ it applies that: $V_{15}=V_{y\,max}$, irrespective of the value of $\xi$.

With $\xi=\epsilon=0$, $V_{15}$ is equal to $V_y$, so that 13 changes over into:

$$R_a=K\left(\frac{V_y}{V_{y\,max}}+H\right)^{1-n}$$

The maximum value of $R_a$ occurs, since $n>1$, at $V_y=0$ and becomes: $R_{a\,max}=K.H.^{(1-n)}$.

$R_{a\,max}$ and hence the value of H are determined by the desired bandwith, so that the value $V'_{g0}$ is fixed. The minimum value of $R_a$ occurs at $V_y=V_{y\,max}$ and is equal to:

$$R_{a\,min}=K(1+H)^{1-n}$$

so that $$\frac{R_{a\,max}}{R_{a\,min}}=\left(\frac{H}{1+H}\right)^{1-n}\approx\frac{\frac{1}{S_{min}}}{\frac{1}{S_{max}}}=\frac{S_{max}}{S_{min}}$$

Substituting the value of H herein, we obtain:

$$\frac{S_{max}}{S_{min}}=\left(\frac{V_{g\,max}-V_{g0}}{V'_{g0}-V_{g0}}\right)^{n-1}$$

For a satisfactory variation in gradation the practice requires a value of this ratio of about 10. $V_{g\,max}$ is restricted to about $-1.3$ V., owing to the requirement that no grid current should flow, so that:

$$\frac{S_{max}}{S_{min}}=\left(\frac{-1{,}3-V_{g0}}{V'_{g0}-V_{g0}}\right)^{n-1}=10$$

This relation means that, within the permissible control-limits the ratio between maximum and minimum steepness must be equal to 10. Since the minimum steepness is determined by the bandwidth requirement, the maximum steepness must be high.

With $\xi=\epsilon\neq0$, the value of $R_{a\,min}$ remains the same; the value of $R_{a\,max}$ becomes: $R_{a\,max}=K(\epsilon+H)^{1-n}$ and this value is, since $n>1$, lower than the value of $R_{a\,max}$ with $\xi=\epsilon=0$, so that, if the adjustment of $\xi=\epsilon=0$ is correct, this remains correct for all other values of $\xi=\epsilon$.

Figure 6:
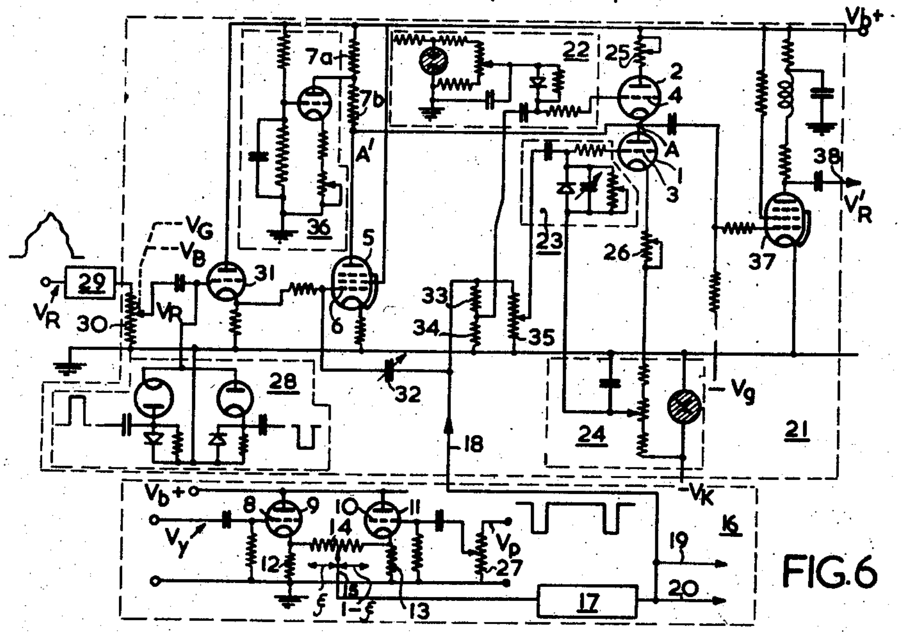
Fig. 6 shows a practical embodiment of the arrangement shown in Figs. 1 and 4 with the required auxiliary apparatus.

The combination of the arrangements shown in Figs. 1 and 4 with the required auxiliary circuits for the adjustment of the direct voltages, the amplification of the signals and further subsidiary functions is shown in Fig. 6, in which corresponding parts are designated as far as possible by the same references.

Referring to Fig. 6, the block 16 represents a practical embodiment of the arrangement shown in Fig. 4, plus a video amplifier 17, which amplifies the signal obtained from tapping 15 and transfers it via the line 18 to the block 21, in which the detailed arrangement of Fig. 1 is illustrated. With the aid of the arrangements shown in the blocks 22, 23 and 24, of the resistors 25 and 26 and of the potentiometer 35, the functions $I_a=k(V_y)$ for the two triode tubes can be caused to coincide as well as possible, so that when the brightness signal is supplied to the tubes 1 and 2 and in the absence of a colour signal at tube 5, no output signal occurs at point A.

With the aid of the arrangement shown in block 36, the voltage at point A′ is to be adjusted in a manner such that, in the absence of the colour signal, no direct current passes through the connection A—A′.

The block 28 represents a so-called synchronous clamping circuit, which serves to bring the grid voltage of the amplifying tube 31 each time for the horizontal black-out time $\tau_1$ to a fixed potential.

The arrangement operates as follows: with the aid of the tapping of resistor 27, the maximum values of the signals occurring across the resistors 12 and 13 are equal to each other. This signal is obtained from tapping 15 and supplied via the line 18 to the resistors 33, 34 and 35.

Owing to the provision of the coupling capacitors, the direct-current component gets lost during this transfer: however, it may be restored with the aid of the unilaterally conductive elements and of the required networks in the blocks 22 and 23.

The signal $V_R$ is supplied via the delay circuit 29, the tapping of resistor 30 and the amplifying tube 31, to the grid 6 of tube 5. Moreover, with the aid of the neutrodynization capacitor 32 the influence of the parasitic capacities between grid and cathode of tube 2 and between grid and anode of tube 1 is obviated.

The corrected signal $V'_R$ may be fed, subsequent to amplification, via a conductor 38, to a further part of the apparatus.

To a second, identical arrangeemnt (not shown) similar to that of block 21, the signal $V_G$ and via the conductor 19 the combined brightness signal are supplied in a similar manner, whilst the corrected signal $V'_G$ can be obtained in a similar manner.

The same process applies to the signal $V_B$, which can be obtained as a corrected signal $V'_B$ via the line 38 from the third identical arrangement similar to that of block 21. The corresponding resistors $R_{30}$ of the three identical arrangements are mechanically connected with one another.

A correction in accordance with the brightness signal occurs by starting from linear colour signals. The normal $\gamma$-correction, relating to the non-linearities of the reproducing tubes, must therefore be carried out subsequently. A calculation shows, however, that an interchange in the aforesaid order of succession gives rise to only small deviations from the desired correction, in a sense such that also the colour saturation exerts a slight influence on the correction.

The corrected colour signals finally obtained may be used, if desired after amplification, to compose the signal to be transmitted in known manner to obtain the brightness signal $V'_y$ and the required composite colour signals. As an alternative, the three signals may be directly fed to the three electron guns concerned of at least one reproducing tube of the reproducing apparatus, if a so-called closed television system is employed.

Figure 7:
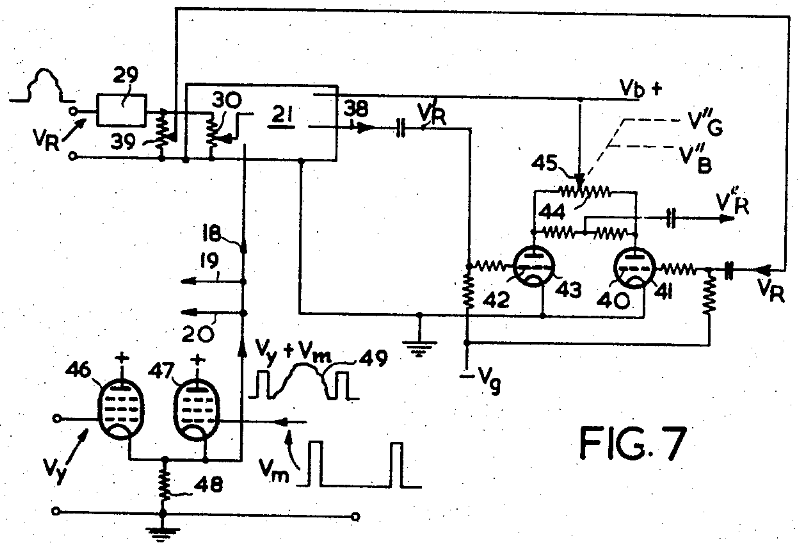
Fig. 7 shows a second practical embodiment of the arrangement shown in Fig. 1 with the further auxiliary devices and Fig. 8 serves for explanation.

A second embodiment is shown in Fig. 7, in which corresponding parts are designated by the same reference as in Fig. 6. In this figure is shown only a detail of the arrangement, i.e. that used for the correction of the signal $V_R$, it will, however, be evident that three identical arrangements are required for the signals $V_R$, $V_G$ and $V_B$. Only the arrangement shown below on the left-hand side of the figure, which comprises the tubes 46 and 47 and the resistor 48, is a single arrangement.

In parallel with the resistor 30 is connected a second resistor 39, from which the uncorrected signal $V_R$ can be obtained, which is fed to the grid 40 of the tube 41. Via the conductor 18, the signal $V_y+V_m$ is supplied. $V_m$ designates a pulsatory marking signal, which is intended to render a push-pull adjustment of the tubes 1 and 2 possible during the operation of the arrangement; $V_y$ is the brightness signal. In this arrangement the signal $V_y$ is not mixed with the signal $V_p$, so that $\epsilon$ is always zero and a constant portion of the triode characteristic curve is covered by $V_y$, so that a maximum corrected signal $V'_R$ is obtained.

The correction is controlled as follows. The corrected signal $V'_R$ is fed via the conductor 38 to the grid 42 of tube 43. With the aid of the variable tapping 45 of resistor 44, linear interpolation is possible between the signals $V_R$ and $V'_R$, so that in accordance with the position of the tapping 45, a more or less corrected signal $V''_R$ can be obtained. If tapping 45 is on the extreme left-hand side, the anode impedance of tube 43 is substantially equal to zero and $V''_R=CV_R$. If tapping 45 is on the extreme right-hand side, the same applies to tube 44 and $V''_R=CV'_R$. The tapping 39 must be adjusted so that the signal $V''_R$ has equal peak-to-peak values in the said extreme positions.

The tappings of the three resistors 45 of the three identical final stages of the aforesaid three identical arrangements for the correction of the signals $V_R$, $V_G$ and $V_B$ are again mechanically coupled with one another, so that the relative ratio between the signals $V''_R$, $V''_G$ and $V''_B$ will remain the same during the control of the correction.

If the adjustment of the tubes 1 and 2 in Fig. 6 is not correct, an interference signal emanating from the brightness signal penetrates into the corrected colour signal. Since this colour signal is of the same form as the brightness signal, the presence of this interference signal can be ascertained only with difficulty, for example with the aid of a cathode-ray oscillograph, so that it is not possible to supervise the push-pull arrangement during the operation of the apparatus.

By adding to the brightness signal the marking signal $V_m$, of which the marking pulse occurs during the horizontal block-out time $\tau_1$ and has a pulse duration of $\tau_2$, to which applies that $\tau_2<\tau_1$, a visual check of the push-pull arrangement is continuously possible, so that a correction of the adjustment may be carried out during the operation of the arrangement, since during the time $\tau_1$ both the brightness signal and the colour signals exhibit periodically a flat level, which corresponds to the ultra black level and during these instants the separate marking signal can be rendered visible.

The auxiliary circuit comprising the tubes 46 and 47 and the cathode resistor 48 serves to add the signal $V_m$ to the signal $V_y$. Across the resistor 48 the signal $V_y+V_m$ is produced, which is illustrated in Fig. 7 at 49, this signal being fed via the conductor 18 to the tubes 1 and 2 (see Fig. 6).

Figure 8:
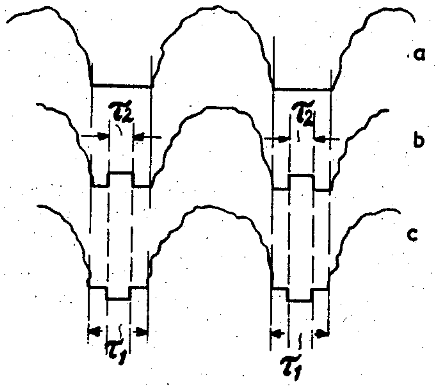

If the push-pull operation is not correct, a signal as illustrated in Fig. 8*b* or 8*c* is produced at point A. With correct push-pull operation the signal is as it is shown in Fig. 8*a*.

By varying the amplitude of the marking signal, it may be ascertained that the push-pull over a large part of the grid-voltage range of the tubes 1 and 2 is correct.

It will be obvious that for correcting more than three signals the described arrangements can be extended by adding the required circuits as shown in Figs. 6 or 7. It should be noted that the polarity of the supplied signals depends upon the intended use, but that it is otherwise arbitrary.

Also for other purposes the aforesaid arrangements may be utilized. For example, when first a few values have to be added and subsequently multiplied by a different function. The principle described above may then be utilized, when the function to be formed can be formed with the aid of the series combination of the triode tubes. By connecting in parallel with the pentode tube 5 one or more further pentode tubes, also the function formed by these pentode tubes may be extended. If, for example, *n* pentode tubes are connected in parallel and if to these tubes are fed the signals $V_1 \ldots V_n$, the total anode current of all pentode tubes will be:

$$I_a=I_{a1}+\ \ldots\ I_{an}=S_p(V_1+\ \ldots\ V_n)$$

For the output voltage at point A a signal is found:

$$V_A=-I_aR_a=-S_p(V_1+\ \ldots\ V_n)R_a$$

wherein $R_a$ is a function of the signal fed to the grids 3 and 4, which signal may depend wholly or partly, at will, upon one of the signals $V_1 \ldots V_n$ or upon any other signal.

The pentodes need, furthermore, not be connected in parallel with tube 1, but they may be connected in parallel with tube 2, whilst tube 2 continues to determine the operative, external impedance of these pentode tubes.

Finally a further extension of the arrangement is possible by extending not only the number of pentode tubes, but also the number of series-connected triode tubes. This may be achieved by connecting in series pairwise, not 2, but $2m$ triode tubes and by connecting the $m$ series combinations in parallel, the junctions $A_I \ldots A_M$ of the $m$ series combinations being connected to one another and to the anodes of the $n$ pentode tubes.

In a similar manner as described above, it may be calculated that:

$$V_A = \frac{S_p(V_1 + \ldots V_n)}{S_I + S_{II} \ldots S_M}$$

wherein $S_I \ldots S_M$ designate the steepnesses of the triode tubes of the $m$ series combination. If to the series combinations are supplied the signals $V_I \ldots V_M$, then:

$$S_I = 1/k(V_I),\ S_{II} = 1/k(V_{II}) \ \ldots \ S_M = 1/k(V_M)$$

from which it follows in accordance with the equation above:

$$V_A = \frac{-S_p(V_1 + \ldots V_n)}{\frac{1}{k(V_I)} + \frac{1}{k(V_{II})} + \ldots \frac{1}{k(V_M)}}$$

wherein $V_1 \ldots V_n$ and $V_I \ldots V_M$ represent again linear functions of each other and/or other variables.

It will be obvious that instead of using discharge tubes other amplifying elements, for example transistors, may be used for this kind of arrangements.

What is claimed is:

1. A circuit for multiplying first and second functions in the form of electrical signals, each of the functions depending upon at least one independently variable third function also in the form of an electrical signal, said circuit comprising first and second substantially identical amplifying devices having control electrodes and output electrodes, a third amplifying device having a control electrode and an output electrode, and being connected in parallel with one of said first and second amplifying devices, means connecting a source of signals of said first function to the control electrode of said third amplifying device, means connecting a source of signals of said second function to the control electrodes of said first and second device, and means connecting an output circuit to the output electrode of said third amplifying device, the output electrode current $i_a$-control electrode voltage $V_g$ characteristic of said first and second amplifying devices having the form:

$$i_a = C_1(V_g - V_{g0})^n$$

where $C_1$ and $n$ are constants, and $V_{g0}$ is the control electrode cutoff voltage of said first and second amplifying devices.

2. A circuit for multiplying first and second functions in the form of electrical signals, each of the functions depending upon at least one independently variable third function also in the form on an electrical signal, said circuit comprising first and second substantially identical triode discharge tubes, the anode of said first tube being connected to the cathode of said second tube, a third discharge tube having an anode connected to the anode of said first tube, a cathode connected to the cathode of said first tube, and a control grid connected to a source of signals of said first function, means connecting a source of signals of said second function to the control grids of said first and second discharge tubes, and output circuit means connected to the anode of said third discharge tube, the anode current $i_a$-control electrode voltage $V_g$ characteristic of said first and second discharge tubes having the form:

$$i_a = C_1(V_g - V_{g0})^n$$

where $C_1$ and $n$ are constants, and $V_{g0}$ is the control electrode cutoff voltage of said first and second discharge tubes.

3. The circuit of claim 2 in which said third discharge tube is a pentode, and a resistance is connected in parallel with said second tube.

4. A circuit for connecting an individual color signal of a color television system by multiplying said color signal by a brightness signal $V_y$ having the form:

$$V_y = \alpha V_R + \beta V_G + \delta V_B$$

wherein $\alpha$, $\beta$ and $\delta$ are linear coefficients, and $V_R$, $V_G$ and $V_B$ are the respective color signals, said circuit comprising first and second substantially identical triode discharge tubes, the anode of said first tube being connected to the cathode of said second tube, a pentode discharge tube having an anode and cathode connected respectively to the anode and cathode of said first discharge tube, means applying said color signal to the control electrode of said pentode tube, means applying said brightness signal to the control electrodes of said triode tubes, and output circuit means connected to the anode of said pentode tube, the anode current $i_a$-grid voltage $V_g$ characteristic of said triode tubes having the form:

$$i_a = C_1(V_g - V_{g0})^n$$

wherein $C_1$ and $n$ are constants, and $V_{g0}$ is the control electrode cutoff voltage of said triode tubes.

5. The circuit of claim 4 in which said means applying said brightness signal to the control electrodes of said triode tubes comprises adding circuit means having a pair of amplifying devices having a common load impedance, means applying said brightness signal to the control electrode of one of said amplifying devices, means applying a pulsatory marking signal to the control electrode of the other of said amplifying devices, the pulses of said marking signal occurring at those instances at which said brightness and color signals exhibit a flat level corresponding to ultra black level, and means applying the signal developed across said common load impedance to the control electrodes of said triode tubes.

6. The circuit of slaim 4 in which the output circuit signal $V'_R$ at the anode of said pentode tube has the form:

$$V'R = -S_p R_a V_R$$

wherein $S_p$ is a tube constant of said pentode tube, $R_a$ is the output impedance of said pentode tube and is determined by said triode tubes, and $V_R$ is the input signal to said pentode tube.

7. The circuit of claim 6 in which the output impedance $R_a$ has the form:

$$R_a = K\left(\frac{V_y}{V_{y\,max}}(1-\epsilon) + (\epsilon + H)\right)^{1-n}$$

wherein K and H are tube constants determined by direct current adjustment, $V_{y\,max}$ is the maximum value of the brightness signal, and $\epsilon$ is a variable determined by the means applying said brightness signal to the control electrodes of said triode tubes.

8. The circuit of claim 7 in which said means applying said brightness signal to the control electrodes of said triode tubes comprises fourth and fifth discharge tubes each having a control electrode and an output electrode, means applying said brightness signal to the control electrode of said fourth tube, means applying a pulsatory signal having constant amplitude to the control electrode of said fifth tube, said constant amplitude being equal to the maximum amplitude of said brightness signal, variably tapped impedance means connecting the output electrodes of said fourth and fifth tubes, and means connecting the tap of said impedance means to the control electrode of at least one of said first and second tubes.

9. The circuit of claim 7 wherein the signal $V_{15}$ at the tap of said impedance means has the form:

$$V_{15}=\xi V_p+(1-\xi)V_y$$

$V_p$ is said pulsatory signal, and $\xi$ is a variable determined by the setting of said tap and is equal to $\epsilon$.

References Cited in the file of this patent

UNITED STATES PATENTS 2,838,661 Chu ------------------- June 10, 1958